United States Patent [19]

Emmett, Jr. et al.

[11] Patent Number: 4,728,082

[45] Date of Patent: Mar. 1, 1988

[54] APPARATUS FOR BIOLOGICAL PROCESSING OF METAL CONTAINING ORES

[75] Inventors: Robert C. Emmett, Jr., Salt Lake City; Lawrence T. O'Connor, Midvale, both of Utah

[73] Assignee: Envirotech Corporation, Salt Lake City, Utah

[21] Appl. No.: 884,205

[22] Filed: Jul. 10, 1986

Related U.S. Application Data

[62] Division of Ser. No. 827,324, Feb. 7, 1986, abandoned.

[51] Int. Cl.[4] .................................................. C22B 3/02
[52] U.S. Cl. .......................................... 266/168; 75/2; 75/97 A; 75/101 R; 423/27; 423/150; 423/DIG. 17
[58] Field of Search ............... 266/101, 168, 187, 188; 75/101 R, 2, 97 A; 423/27, DIG. 17, 150

[56] References Cited

U.S. PATENT DOCUMENTS 3,836,131  9/1974  Beggs .................................. 266/168

FOREIGN PATENT DOCUMENTS 0800221  1/1981  U.S.S.R. ............................... 266/168
0899119  1/1982  U.S.S.R. ............................... 266/168

Primary Examiner—Robert L. Stoll
Attorney, Agent, or Firm—Trask, Britt & Rossa

[57] ABSTRACT

A method and attendant apparatus for use in bioleach processing of metal-bearing solids is disclosed. The method includes the placement into a tank of metal-bearing solids, a predetermined quantity of water, oxygen, carbon dioxide, nutrients and a species of microorganisms capable of oxidizing some portion of the metal-bearing solids and obtaining energy for growth from that oxidation. The slurry formed by this placement is continuously filtered to remove process delimiting metabolic end products produced by the oxidation reaction. The ratios of the various slurry components are monitored and controlled to effectuate an optimized environment for oxidation to occur. The attendant apparatus includes a means of introducing oxygen into the bottom of the reactor vessel in the form of small widely dispersed bubbles.

24 Claims, 15 Drawing Figures

APPARATUS FOR BIOLOGICAL PROCESSING OF METAL CONTAINING ORES

This is a division, of application Ser. No. 827,324 filed Feb. 7, 1986 now abandoned.

BACKGROUND OF THE INVENTION

1. Field

This invention is directed to a process and attendant apparatus for use in processing metal-containing ores by use of a biological (hereinafter "bioleaching") technique. More particularly, this invention is directed toward a process and apparatus for use in processing precious metal-bearing pyrite ore concentrates which are not efficiently leachable by conventional processes and means, such as leaching using cyanide solutions.

2. State of the Art

Recent interest in the metallurgical field has focused on the use of special types of autotrophic bacteria, e.g. thiobacillus ferrooxidans and thiobacillus thiooxidans, in treating sulfide ores and concentrates. The use of such bacteria in heap leaching treatments to solubilize copper from low-grade ores has been known for several decades. Currently, however, the interest in applying this biochemical technology has been focused on continuous processes to treat sulfide concentrates. These continuous processes either make the concentrates more susceptible to conventional cyanide leaching or extract the desired metal from the concentrate.

Particularly, attention has been focused on gold-bearing or silver-bearing pyrites and arsenopyrites that are at best marginally susceptible to cyanide solution leaching. These concentrates' insusceptibility to cyanide leaching is due to the desired metals, e.g. gold or silver, being encapsulated by the pyrite crystal. The pyrite crystal is insufficiently porous to allow penetration of the cyanide solution for a metal-cyanide dissolution reaction to take place. Comminution of the metal-bearing pyrite, in itself, does not expose sufficient metal values to be economically feasible inasmuch as greatly increased cyanide solution and energy consumption are required.

The above-described bacteria can, however, induce the biooxidation of sulfide and iron in the unsolubilized pyrite crystal, leaving the gold, silver or platinum intact. The resulting residue, after separation of the soluble leach products, is amenable to metal extraction employing conventional cyanide, thiourea, or thiosulfate solution leaching techniques. On occasion, even partial biooxidation by the above-described bacteria is sufficient to allow successful cyanide solution leaching of this residue. The described process is adaptable to the leaching of other metals. For example, chalcopyrite can be leached for its copper content, and zinc sulfides can be leached to produce zinc sulfate solutions ($ZnSO_4$). Other elements present as sulfides may also be solubilized, such as antimony and arsenic.

The current processes using the above-described bacteria for solubilizing the metal-bearing sulfide ores and concentrates are very energy intensive. The chemical reaction used by these bacteria is oxidation. Hence, oxygen transfer is a key step in the process. Approximately an equal weight of oxygen is required to oxidize pyrite. The systems currently employed in the art require one horsepower hour per approximately 2.5 to 4 pounds of oxygen transferred into liquid phase. Consequently, to oxidize one ton (2,000 pounds) of concentrate, these systems consume approximately 400 to 600 kilowatt hours (KWH) of energy.

Metallurgical processing by leaching typically employs a number of tanks operating in series, each tank overflowing into a subsequent tank so that the total retention time in the circuit is that required for processing. Reagents required for leaching are usually added to the first tank, and if necessary, to subsequent tanks. With bioleaching, there is a significant time required for bacterial growth to reach a level of suitable bioactivity. Simply adding bacteria to the first tank will not immediately provide sufficient numbers of microorganisms to achieve any great degree of processing. Furthermore, as the pulp flows from one tank to the next and the bioreaction continues, the amount of soluble material produced can become very high. Soluble material is a product of the bioleaching operation, which if present in the reaction tank in excessive proportion inhibits the speed of the reaction. Thus, without selective removal of this soluble material, the reaction rate is diminished and the process is slowed.

One of the critical problems involved in developing a workable process is the transfer of nutrients and oxygen into the tanks in sufficient quantities so as to be readily assimilated by the bacteria. Problems associated with transfer of the oxygen are distinguishable from those encountered providing nutrients and carbon dioxide Since oxygen transfer is critical and the quantity required is very large, this part of the process is of paramount importance to overall process cost and performance. The method practiced conventionally involves injecting large quantities of oxygen directly into the solution and providing a mixing means whereby the oxygen is interspersed or distributed within the solution. In other words, these processes involve introducing the oxygen and transferring it from a gas phase into an aqueous phase, i.e., dissolving it within the solution.

The method conventionally adopted to effect this transition is the use of turbines which are placed within the slurry and rotated at typically high speeds. Though the turbine action does achieve considerable mixing action, i.e., dispersion, of the oxygen with the solution, the rotation of the turbines also results in cavitation effects. These effects cause the air bubbles within the solution to be forcedly aggregated into larger air masses or bubbles due to the vacuum effects and turbulence attendant the action of the turbine blades. Resultingly, the turbines though functioning to disperse the air within the slurry also function to create large air masses or bubbles which have a relatively small surface area to volume ratio. A basic problem confronting the conventional technology is the power requirement requisite to operate the turbines. More specifically, the turbine power is that required to turn the blades at a sufficient velocity to achieve the desired quantity of oxygen being introduced into the aqueous phase of the solution so as to be readily assimilated by the bacteria. A considerable mixing action is required, necessitating a high tip speed on the turbine rotor blades. Understandably, this high tip speed is only obtained by an infusion of considerable quantities of energy into the turbine itself.

A second problem confronting the current technology is the removal of soluble matter produced within the solution by the reactions effected or initiated by the presence of the bacteria. One approach which is typically considered is the use of a thickener into which slurry is admitted and from which soluble components are removed via the overflow. This approach generally results in the bacteria which are suspended within the liquid phase being likewise carried away, thereby slowing the process reaction rate. Furthermore, the bacteria which remain with the solids are deprived of requisite oxygen and resultingly tend to slow their activity and further delimit the rate of the process.

A third major problem is the length of overall retention time required to achieve a desired extent of biooxidation. Systems currently employed require a retention time of many days. The retention time is inversely proportional to reaction rate, which is found to be enhanced by maximization of oxygen and nutrient supply, and delimited by the presence of reacted products and by-products in the reaction vessel and by the loss of biomass (i.e., microorganisms) to the reactor effluent.

Failure of the current art to address effectively the above aspects of bioleaching has resulted in current bioreactors and processes being marginally efficient in both cost and process performance.

SUMMARY OF THE INVENTION

The bioreactor vessel of the instant invention consists generally of a tank having a bottom and upstanding walls fixedly mounted thereon adapted to receive and contain a liquid medium. The tank is fitted with a mechanical mixing means which operates to effectuate an agitation and suspension of the particulates within the slurry liquid housed within the tank. An air supply means operates to provide oxygen, which is a necessary component of the biooxidation reaction taking place within the bioreactor. The air supply means also provides an air lift suspension of the particulates within the slurry liquid housed within the tank.

The slurry mixer is comprised of a tank wherein a center mounted shaft with radially mounted arms is rotated to cause mechanical mixing and agitation of the slurry contained in the tank.

The air supply means of the invention generally involves the introduction of minute air bubbles near the bottom regions of the tank by a plurality of diffusers. The diffusers are mounted and oriented in such a way that the slurry in close proximity to the diffusers is in a state of agitation. This agitation is of a sufficient degree that the particulates and liquid of the slurry act to scour and cleanse the slurry-exposed surfaces of the diffuser. This scouring and cleansing action reduces the tendency of the diffuser pores to plug. The diffusers may be mounted in spaced relationship along the length of each radial arm of the slurry mixer mechanism. The radial arms may be rotated about an essentially upright, vertical axis. The diffusers are thus rotated so as to distribute rising air bubbles effectively over a substantially horizontally oriented planar area of the lower regions of the tank.

The number of individual diffusers employed and their location relative to each other and to the plan area by way of their mounting on the radial arms of the slurry mixer are determined by the total amount of air required by the biooxidation occurring within the bioreactor. Further, the number and location of diffusers are determined by the oxygen transfer efficiency and capacity of the individual diffusers. The diffusers may each include a vertically mounted porous membrane. This membrane may be substantially planar in appearance with its mounting. The membrane includes a plurality of pores or orifices oriented such that the apparent air flow through these pores or orifices outwardly through the surface of the diffuser is substantially transverse to the slurry flow along the diffuser surface. The diffusers are mounted on the radial arms of the slurry mixer so as to maximize the local turbulence and cleansing action of the slurry in close proximity to the diffuser. The pore size of the diffusers and the location of their mounting on the radial arms of the slurry mixer mechanism is determined to produce optimally air bubbles having an approximate mean diameter of two millimeters or less. This mean bubble diameter is based on measurements taken in a bioreactor filled with clear water.

The air supply means of the instant invention functions to achieve an enhanced surface area to volume ratio of the air bubbles while at the same time minimizing the possibilities or opportunities for aggregation of the various bubbles into larger masses of bubbles having a smaller surface area to volume ratio. In this manner, the instant invention achieves a greater assimilation condition or capability for the oxygen to be transferred into liquid solution or directly to the bacteria for purposes of assimilation and subsequent consumption in the biooxidation reaction. Further, the rotation of the radial arms of the slurry mixer mechanism effects a minimal agitation of the liquid within the bioreactor vessel, thereby minimizing energy consumption as compared with the conventional means of utilizing a turbine. The shear conditions which are produced by agitation have as a consequence the stripping of bacteria from suspended solids. The separation of the bacteria from those solids delimits the reaction rate of those bacteria on the solids.

The bioreactor vessel may include a solid center shaft or a large hollow pipe fitted with internal piping necessary to provide air to the radially-mounted mixer arms on which are mounted the diffusers. The selection of a hollow pipe permits the introduction of air from a supply located external to the tank. This air may be injected into the pipe and directed downwardly eventually being driven to the diffusers through the mixer arms positioned proximate the bottom of the tank. Alternately, a solid shaft may be employed. This alternative construction may include having the drive shaft mounted on a foot or thrust bearing. An air conveying pipeline may be extended into a recess well defined within the portion of the shaft proximate its seating within the foot bearing. The recess well communicates with the mixer arms and the diffusers mounted thereon. The recess well includes a sealing means configured to retain air received within the well from escaping outwardly into the slurry except by passage through the mixer arms and their associated diffusers. Additional internal piping may also be provided to remove heat from the slurry contained in the bioreactor by the circulation of cold fluids through such piping.

Slurry may also be circulated from the lower portions of the tank through the center shaft pipe to radially-mounted riffle tubes at the upper end of the tank, which are used to enhance gravitation separation of high specific gravity solids, i.e. free gold, before the slurry is returned to the general confines of the tank. Slurry circulation across the riffle tubes is an energy efficient means of collecting free gold and other high specific gravity solids or deposits. The riffle tubes operate to prevent the accumulation of such solids or deposits on the bottom of the bioreactor tank. A lifting mechanism to mechanically raise and lower the radial mixing arms of the bioreactor may be provided to facilitate the cleaning of the mixing arms and the diffusers mounted thereon. A vacuum filter may be mounted within the bioreactor tank to remove clear liquor containing dissolved products and by-products from the vessel while leaving the bacteria and slurry solids within the vessel.

The process of the instant invention generally includes the steps of grinding the concentrate or ore; placing the concentrate or ore and other reactants, including bacteria, in a primary bioreactor in such a way as to achieve a high rate of bioreaction; removing the soluble products and by-products; and directing the insoluble and partially reacted solids to a secondary bioreactor or series of bioreactors to allow for the completion of biooxidation.

Optimization of overall biooxidation rate, thus minimizing solids residence time and equipment size and cost, can be achieved only if the primary bioreactor is operated in such a manner so as to achieve the maximum consumption of oxygen, e.g. biooxidation rate, without attempting to control coincidentally the extent to which the concentrate or ore constituents are being oxidized while within the primary bioreactor. The normally recognized biochemical oxidation reaction involves the dissolution of oxygen in water, followed by the bacterial assimilation of that dissolved oxygen. The bacteria subsequently use the assimilated oxygen to oxidize biochemically the sulfide and iron species. This biooxidation is the essence of the bioleaching process.

In a bioreactor such as that of the instant invention, the bioreaction environment can be controlled such that oxygen transfer is also accomplished interfacially from a gas directly to the bacteria In other words, oxygen transfer is effected without involving the otherwise reaction rate-limiting oxygen dissolution step. This phenomenon has been physically proven in the process of the instant invention by obtaining rates of oxygen consumption via biooxidation which far exceed the maximum oxygen transfer rate possible for oxygen dissolution in solutions of the same composition. Overall achievable mass transfer coefficients are two to three times those of conventional processes. Whereas the bioreactors of the current art have oxygen uptake (e.g. usage) rates of less than 200 milligrams per liter per hour, generally equivalent to the oxygen dissolution rate, the process of the instant invention has performed at rates exceeding 500 milligrams per liter per hour in the primary bioreactor.

The secondary bioreactor or bioreactors of the process of the instant invention generally operate(s) at oxygen uptake rates similar to the bioreactors of the current art. However, since as much as 90% of the biooxidation occurs in any primary bioreactor, it is the primary bioreactor which is rate limiting. Thus, due to the enhanced efficiency of the primary bioreactor of the instant invention, the secondary bioreactor and the overall process requires much less time to achieve a desired extent of biooxidation.

The essence of the process of the instant invention is the control of the reaction environment within the bioreactors, particularly the primary reactor. The factors controlled in each bioreactor in the process of the instant invention include temperature, the rate and mechanism of oxygen input, the ratio of biomass (i.e. bacteria) to suspended solids, the ratio of reacted (i.e. inert) solids to unreacted solids, the concentration of soluble species generated as products or by-products, and the concentration of carbon dioxide and nutrients provided for bacterial growth.

Since the biooxidation reaction produces heat, a mechanism for heat removal may be provided as part of the process. Oxygen supply in the form of very small bubbles of sufficient number to sustain the bacteria is, if insufficient, the limiting factor on overall rate of the process. Both temperature control and oxygen supply are factors governed by the mechanical design of the bioreactor.

Maintaining the optimum ratios of biomass to reacted solids to unreacted solids and the optimum ratio of reacted solids is a task requiring the use of equipment ancillary to the bioreactor. Reacted solids can be separated from unreacted solids by the use of a selective gravity separation in a cyclone, centrifuge, or gravity settling device (i.e., a hydro-separator). The separation employs the differences in particle size or relative density, i.e. specific gravity, of the feed and product solids, allowing the more rapid settling of the larger and more dense sulfide, i.e. unreacted, solids as compared to the less dense oxidized solids. Selective flocculation or agglomeration of these species may also be employed to enhance the efficiency of their separation.

Soluble constituents in the reaction slurry act to delimit the rate of bioreaction. The control of soluble constituents in the reaction slurry may be achieved by the removal of suspended solids-free liquor from the slurry while retaining the bacteria within the slurry. This is achieved by a filtration mechanism internal to the bioreactor or a gravity separation of liquid and solids by the use of a cyclone, centrifuge, or clarifier. Flocculation of all the suspended solids will enhance the solids-liquid separation. The clarified filtrate or overflow is removed from the system, while all captured solids are recycled to the bioreactor.

It is desirable for the process of this invention that biomass, i.e. bacteria, be maintained at as high a number level as possible in each bioreactor. The concentrate or ore feed, oxygen, carbon dioxide, and nutrients provide an environment for bacteria to grow and increase in number. Whatever bacteria leave the bioreactor thus leave only in combination with product, i.e. reacted, suspended solids, to which they are physically attached. Mechanisms for the removal of soluble constituents and liquors are designed so as to not remove bacteria coincidentally.

The process of the instant invention also includes a mechanism for the recycle of carbon dioxide and nutrients from chemically neutralized product and by-product streams. This recycling practice reduces the overall operating cost of the process.

DESCRIPTION OF THE ILLUSTRATED EMBODIMENTS

Figure 1:
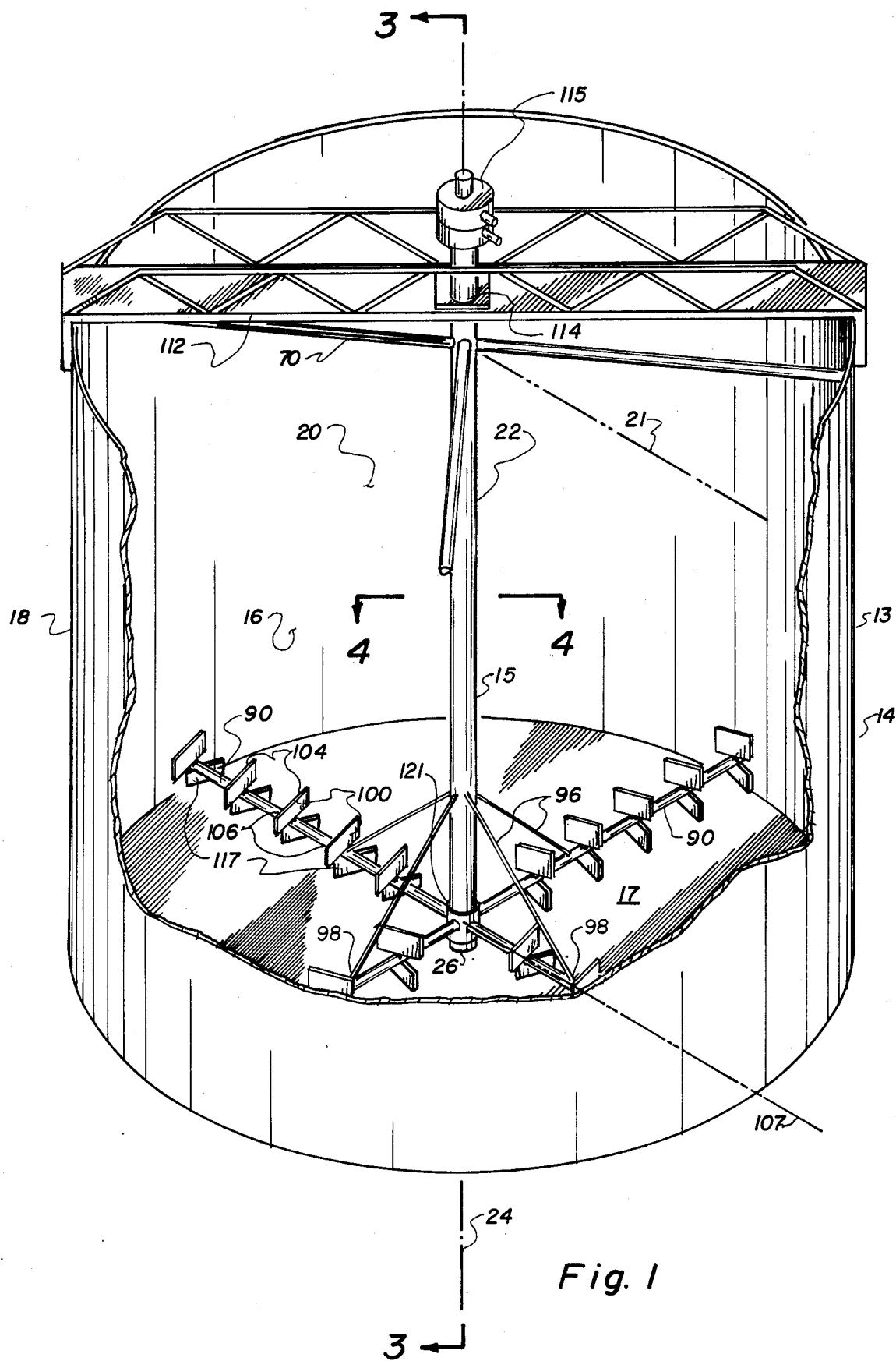
FIG. 1 is an elevated perspective view of the bioreactor vessel of the instant invention including a cut-away portion which reveals a centrally positioned support member fixedly mounted with a plurality of rotating, radially extending arm-like members positioned about the lower regions of that support member.
Figure 2:
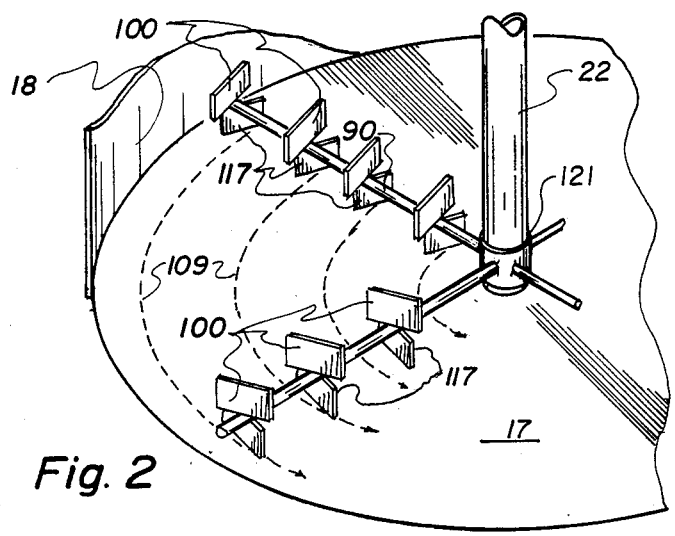
FIG. 2 is an elevated perspective view of the lower portion of the support member shown in FIG. 1.

As shown in FIG. 1, a bioreactor vessel, generally 13, of the instant invention includes an open-ended tank 14 having suspended therein an air supply means generally 15 adapted to inject air received from a source exterior of the tank 14 into a liquid medium, generally 16, which is contained within the tank.

The tank 14 consists generally of a bottom member 17 which is fixedly and sealingly mounted with an upstanding vertical wall or walls 18. As shown, the bottom member 17 may be generally planar and circular in plan view. The upstanding vertical walls 18 may be a single tubular-shaped wall whereby the tank obtains a substantially cylindrical configuration having an open port or end 20. In a preferred embodiment, the vertical walls 18 define a tank diameter 21 which remains constant over the height of the tank. The upright walls 18 and the bottom planar member 17 are fabricated from materials which are chemically resistant to the solids, slurry or by-products which may be housed within the tank. Materials such as stainless steel are generally used in constructing the tank. The height of walls 18 is preferably of sufficient dimension to permit a storage of fluid within tank 14 having a depth of at least twelve (12) feet.

Positioned within the tank is an air supply means 15. As shown, this supply means may include a tubular support shaft 22 which may be positioned centrally and upright within the tank. Shaft 22 includes a longitudinal axis 24 which is oriented substantially upright and which furthermore passes through, or may be co-linear to, the longitudinal axis 26 of the tank 14. The support shaft 22 may be structurally configured in a variety of shapes. As shown, the support means may be a substantially cylindrical, tubular pipe member which extends from a point which is above any anticipated liquid level 27 to be obtained within the tank 14, downwardly to a point proximate the bottom plate 17 of the tank.

Figure 4:
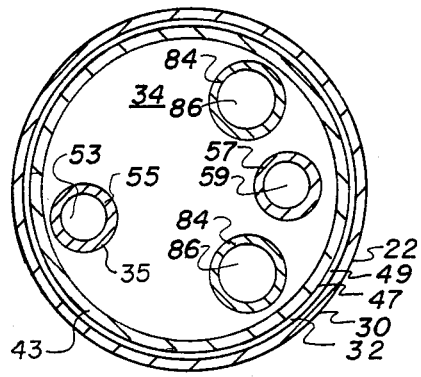
FIG. 4 is a cross-sectional view taken of the support member of the bioreactor vessel shown in FIG. 1 taken along sectional lines 3—3.
Figure 3:
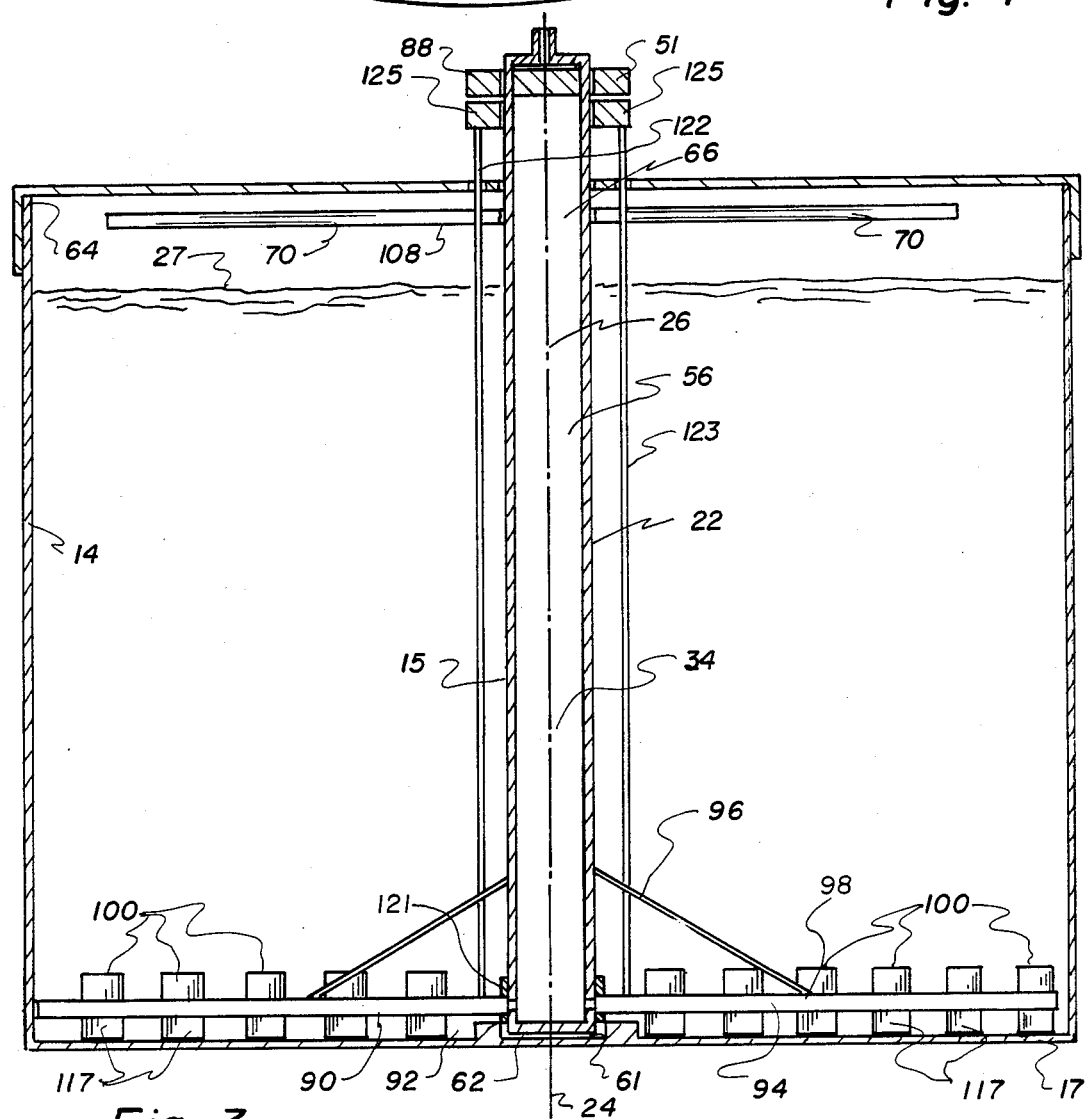
FIG. 3 is a cross-sectional view of the bioreactor vessel shown in FIG. 1.

Support shaft 22, as shown in FIG. 4, may include an exterior wall 30 and an interior wall 32. Interior wall 32 defines an interior cylindrical channel 34. Channel 34 provides a location for the positioning of a plurality of cylindrical tubular pipes.

The oxidation and reduction processes accomplished within the reactor vessel are exothermic in nature. The instant invention contemplates a heat transfer mechanism whereby heat produced within the liquid contained in the reactor vessel may be dissipated or removed from the reactor vessel.

As shown, in a preferred construction a second tubular, cylindrical pipe member 43 is positioned within shaft 22. Tubular pipe member 43 is substantially similar in configuration to shaft 22 and further shares the same longitudinal axis 24. A first channel 49 is defined by the interior wall 32 of shaft 22 and the exterior face 47 of tubular pipe member 43. Channel 49 is substantially annular in cross-section. Channel 49 extends along the height of shaft 22. Channel 49 communicates with a supply means 51 positioned on the upper end of shaft 22. Supply means 51 is adapted to supply a pressurized flow of fluid to channel 49. Channel 49 receives that fluid and directs it downwardly along the length of the channel.

The fluid, e.g. water, flows along the surface interior wall 32 and acts to absorb heat from shaft 22. The described heat is that which is generated within the container-retained slurry 16 due to the oxidation reactions occurring therein. Upon the fluid reaching the end of channel 49, proximate the bottom 17 of the tank, the fluid is directed into a channel 53 defined by a tubular pipe member 55 housed within shaft 22. The heat-laden fluid, being under pressure, is thereafter driven upwardly through channel 53 until reaching a location proximate the upper reaches of shaft 22. Since the slurry 56 within channel 34 contacts the exterior surface of pipe 55, the fluid in channel 53 also absorbs heat from slurry 56. A discharge means (not shown) is connected to tubular pipe member 55 and operates to receive the heat-laden fluid from the channel 49 and dispose of same. The arrangement of channel 49, together with pipe 55, supply means 51, and the discharge means, forms the heat exchanger adapted to remove heat generated by the exothermic reactions occurring within the tank 14. Heat may also be removed from the slurry by the air introduced into the vessel by air supply means 15, i.e., the air injected into the slurry 16 is of a sufficiently low temperature and humidity that as it rises through the slurry after its introduction it absorbs heat from the slurry and conveys that heat upwardly eventually discharging it to the environment upon the air bubble breaking the surface of the slurry. Alternately, the heat exchanger may include fluid conducting coils positioned about the walls 18 of the reactor vessel.

A pipe 57 positioned within channel 34 of shaft 22 is adapted with an interior channel 59. Channel 59 is used to receive a pressurized supply of air or oxygen-containing gas from a source (not shown) exterior to the tank 14. The channel 59 directs that air down to the lower regions of the support shaft 22. The air is thereafter introduced into the slurry for purposes of air lift suspension of the particulates (solids) within the slurry itself.

Figure 10:
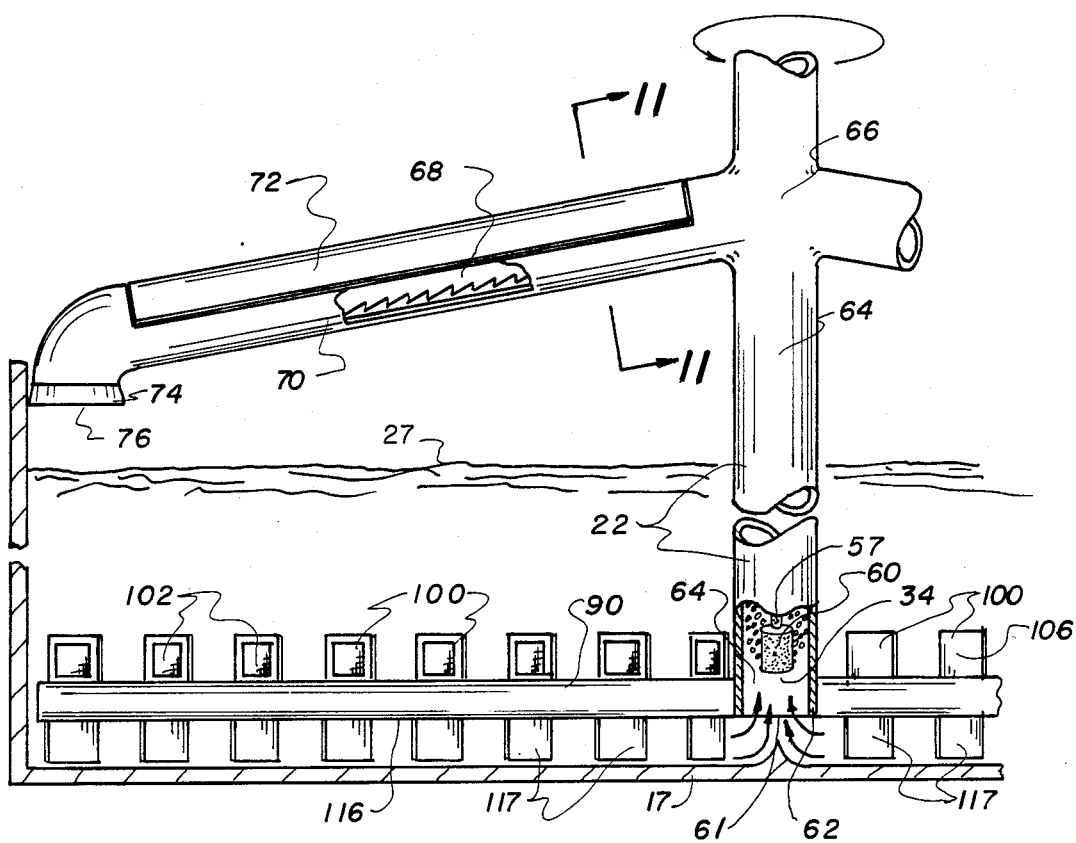
FIG. 10 is a side view of the riffle tube arrangement as found in the bioreactor vessel illustrated in FIG. 1.

As shown in FIG. 10, pipe 57 extends to a location proximate the bottom 17 of tank 14. The pipe 57 may be fitted on its end with a diffuser 60. As illustrated, air is injected through diffuser 60 into the channel 34. Channel 34 communicates with the slurry 16 within the tank 14 by means of an access port 61. Access port 61 is defined by the open end 62 of shaft 22 which is positioned above and out of contact with bottom member 17 of tank 14. As air is injected into the interior of channel 34, a portion 64 of the slurry 16 contained within the channel 34 is driven upwardly along channel 34. Upon reaching the region 66 of channel 34, the slurry portion 64 is directed through a plurality of channels 68 defined by a plurality of riffle tubes 70 which are fixedly mounted to shaft 22. Channels 68 communicate with channel 34.

As shown in FIG. 10, riffle tubes 70 include a substantially cylindrical housing 72 which extends radially from shaft 22. Each riffle tube 70 is fitted at its end 74 with a discharge port 76 which directs the slurry downward. The slurry, in being discharged from the riffle tubes 70, is impacted against the upper surface 27 of the slurry 16 contained within the tank 14. This impacting or discharging of the riffle tube-contained slurry functions to break down foam formations engendered on the slurry surface 27 due to the reactions and turbulence within the slurry 16. Since the riffle tubes are rotated about the axis 24 of shaft 22, the riffle tubes operate to discharge lifted slurry over a substantially circular pattern about the surface 78 of slurry 16. Each riffle tube 70 is fitted with a sawtooth floor structure 80 mounted on the interior floor of wall 82 of the tubes 70.

These sawtooth structures function to trap solids, e.g. free gold, silver, or other precious metals present having a high specific gravity, which are contained within the slurry flow being directed through the riffle tubes 70. The principles made operative in the use of these sawtooth structures are essentially those employed in a conventional sluicing operation.

Figure 11:
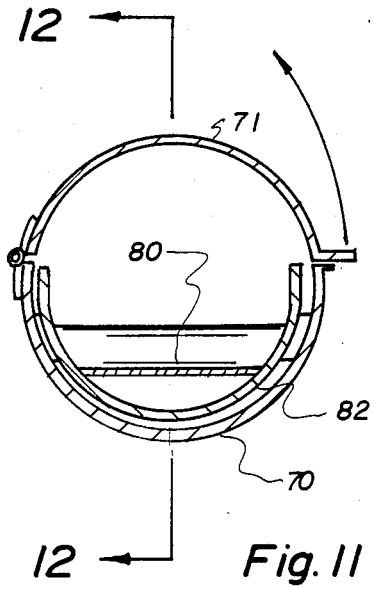
FIG. 11 is a cross-sectional view of the riffle tube arrangement illustrated in FIG. 10 taken along sectional lines 11—11.
Figure 12:
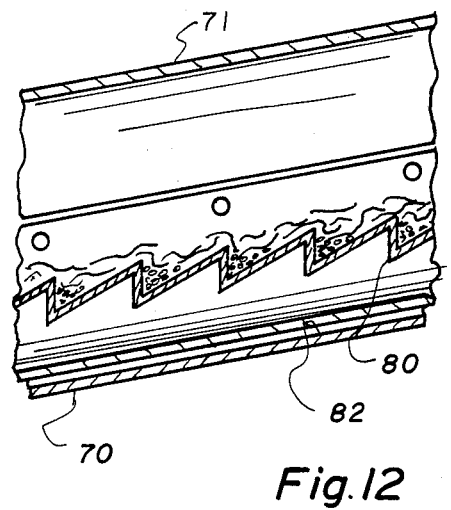
FIG. 12 is a cross-sectional view of the riffle tube arrangement shown in FIG. 11, taken along sectional lines 12—12.
Figure 13:
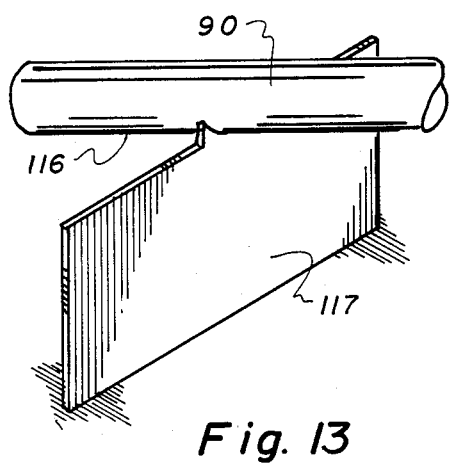
FIG. 13 is an elevated perspective view of a rake-like extension.
Figure 14:
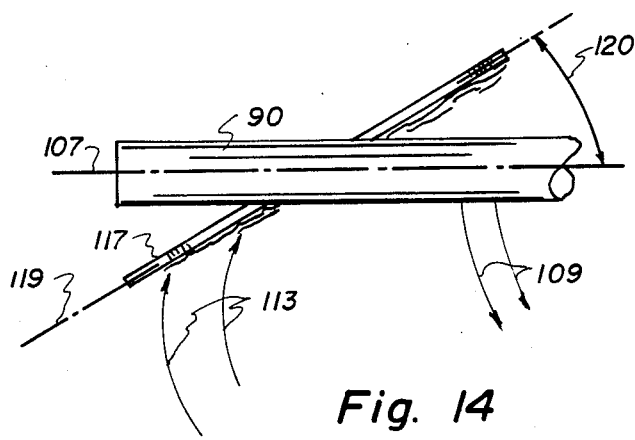
FIG. 14 is a top view of the rake-like extension shown in FIG. 13 illustrating the positioning of the extension vis-a-vis its support arm.
Figure 15:
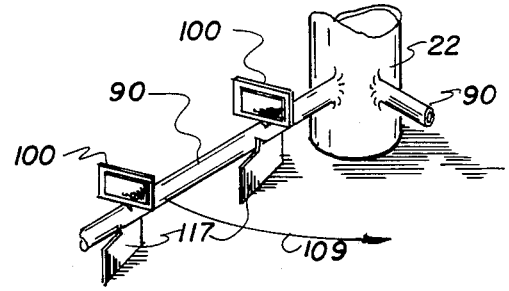
FIG. 15 is an elevational perspective view of the diffuser and rake-like extension mountings on a support arm.

As shown in FIG. 11, the upper portion of each riffle tube 70 is fitted with a hinged door 71 adapted for permitting the user to access the channel-housed sawtooth structures 80 for purposes of removing the trapped solids.

As shown in FIG. 4, within channel 34 are positioned a pair of cylindrical, tubular pipe members 84 defining a pair of interior channels 86. In an alternate construction these pipes 84 and channels 86 may be external to shaft 22. Pipes 84 extend from a supply means 88 positioned proximate the end of shaft 22 downwardly through channel 34 to a location proximate the position of a plurality of radially extending arms 90. Supply means 88 is adapted to provide a supply of oxygen-containing gas under pressure to channels 86 and force that gas along the length of those channels 86. Channels 86 communicate at their ends with one or more channels 94 defined, respectively, within the interior of each radially extending arm 90.

Each radial arm 90 extends essentially perpendicular outwardly or radially from the support shaft 22 and is dimensioned so as to extend from that shaft 22 to a location proximate the wall 18 of the tank 14. Each radial arm 90 may be supported by a support arm 96 which extends from the shaft 22 outwardly and is fixedly mounted on the radial arm 90 at point 98.

As shown in FIG. 1, radial arms 90 are fitted with a plurality of diffusers 100 which communicate with the interior channel 94 of the radial arm 90 whereby air is driven downward through channel 86 and directed into the interior channel 94 housed within each radial arm 90. Thereafter, the air is directed through the diffusers 100, thereby permitting the oxygen or air to be directed upwardly and outwardly into the slurry 16 residing within the tank 14.

In preferred embodiments, the diffusers 100 each include a permeable, replaceable membrane 101 having a hydrophobic outer surface. The membrane 101 defines a plurality of extremely small pores or orifices 102 preferably having mean diameters of ten (10) microns or less. In a preferred construction, the membrane 101 is fabricated from a nylon, polypropylene, or polyester fabric having a sealant film, e.g., urethane acrylic copolymer or polytetrafluroethylene, applied or laminated thereon. Suitable membrane materials may include those available commercially under such trademarks as GORETEX, TYVEK, VERSAPOR and ENTRANT. The membrane 101 is held within a rigid frame structure 104 which retains the membrane 101 in a selected relationship with its respective rotating arm 90.

Figure 7:
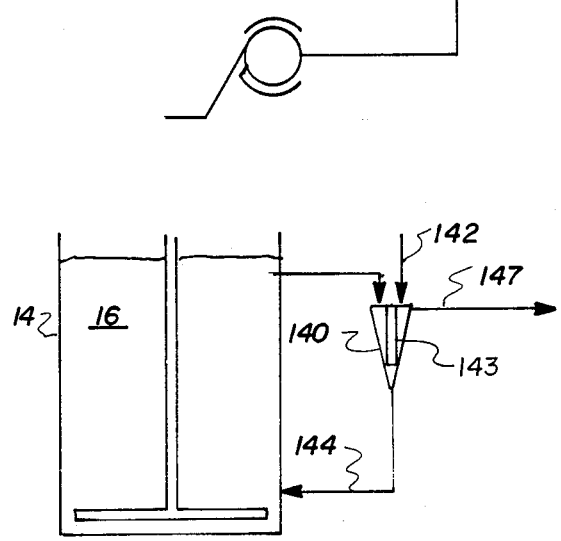
FIG. 7 is a schematic process diagram illustrating a separation process of the instant invention.
Figure 8:
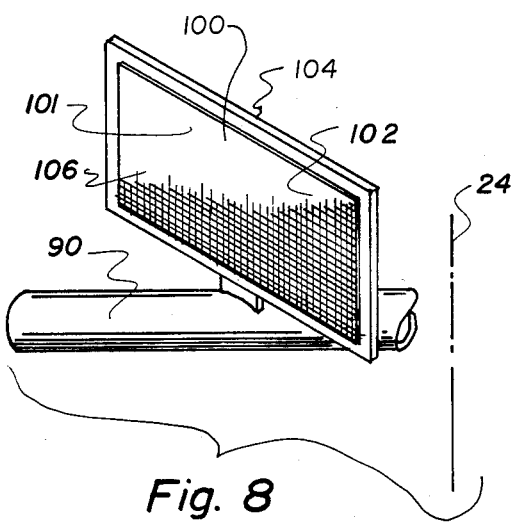
FIG. 8 is an elevational perspective view of a diffuser of the invention.

The initial requirement of the diffuser orientation is the provision of an upright, vertical surface over which the slurry can flow and scour that surface so as to prevent clogging. As shown, the face 106 of each membrane 101 is oriented in an essentially upright vertical position such that air exiting the diffuser face is directed initially horizontally outward and upon exiting the diffuser 100 rises vertically upward. The membrane preferably includes a planar face though various other membrane configurations are within contemplation, e.g., upright cylindrical. The air or oxygen found within the diffuser 100 is typically under a pressure of 5 to 25 psig. As illustrated in FIGS. 7 and 8, the diffusers 100 are preferably rectangular in plan view having a longitudinal axis 105. Diffusers 100 may include a pair of planar faces 106. As shown, a diffuser 100 typically includes a membrane 101 with only one planar face 106. In a preferred construction, diffuser longitudinal axis 105 is positioned substantially perpendicular to the longitudinal axis 107 of the respective radially extending arm 90. Alternate diffuser positions are within contemplation. Specifically, orientations wherein the angle 108 is varied between 90° and 270°.

Figure 9:
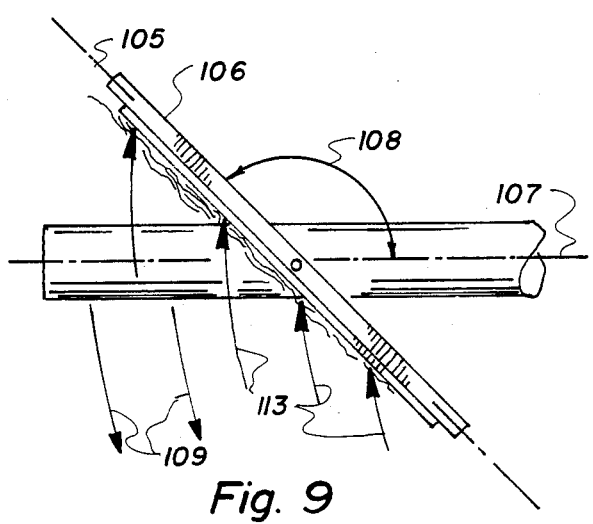
FIG. 9 is a top view of the diffuser shown in FIG. 8.

Angle 108 is that angle extant between axis 107 and axis 105 determined by a counter-clockwise rotation, as shown in FIG. 9. The diffuser 100 is positioned to cause the slurry 16 to collide with air bubbles which exit the diffuser pores 102. This collision serves to disperse or break up the air bubbles into smaller bubbles. Further, the passage or brushing of the slurry 16 over the diffuser face 106 serves to scour or cleanse that face and prevent the buildup of material on the face 106, which buildup causes clogging of the diffuser pores 102.

As shown in FIG. 9, the rotating arm 90 typically rotates in a counter-clockwise direction (shown by arrows 109) about the central longitudinal axis 24 of shaft 22. Given this rotation, slurry flows in a direction generally shown by arrows 113 along the face of the diffuser membrane 101, thereby accomplishing the scouring function.

Diffuser pores 102 are dimensioned such that in operation the diffusers 100 produce air bubbles having a mean diameter less than approximately two millimeters. These diameters are determined by diffuser introduction of air into the vessel when that vessel is filled with clear water as opposed to slurry.

The support shaft 22 may also function as a drive shaft for purposes of rotating the plurality of radially extending arm-like members 90 which are positioned on that shaft 22 proximate the region near the bottom 17 of the tank 14.

Positioned on the upper region of tank 14 is a bridge support 112 which extends essentially across the diameter 21 of tank 14. In the central region of bridge 112 proximate the longitudinal axis 26 of tank 14 the bridge 112 includes an aperture 114 which is adapted to receive the support shaft 22 and permit the rotation of that shaft within the aperture 114. A power transmission means 115 may be mechanically connected with the portion of shaft 22 which extends above bridge 112. This transmission means 115 operates to rotate shaft 22 about its axis 26 and further effects a rotation of arms 90 and riffle tubes 70.

Fitted on the lower surface 116 of each radial arm 90 may be a plurality of rake-like extensions 117. Rake-like extensions 117 are adapted to effect a squeegee-like action, i.e. scrape against the tank bottom 17, and thereby collect solids or particulates which have been deposited on the tank bottom 17 and direct them to a central collecting location. Rake-like extensions 117 may include a plurality of planar panels, each panel having a respective longitudinal axis 119. As shown, longitudinal axis 119 is oriented with respect to axis 107 of the respective arm-like member 90 at a counter-clockwise rotation angle 120. Angle 120 may vary between approximately 45° to approximately 90°. The critical aspect of the extensions 117 orientation is its capacity to direct solids which have become deposited on the bottom 17 or floor of the reactor vessel 13, to a common collection location.

The radially extending arms 90 may be mounted on shaft 22 to be vertically slidable along that shaft. In one construction, the arms 90 and supports 96 are mounted to a tubular cylindrical sleeve 121 which is slidably positioned on the exterior of shaft 22. Sleeve 121 is made rotatable with shaft 22 by means of a releaseable key lock system which links shaft 22 with sleeve 121. The slidability of sleeve 121 is enhanced by an elevational control system 122 which permits the operator selectively to raise or lower the arms 90 at will. This control system 122 may include a plurality of cables 123 which are mounted to either the arms 90 or alternately to the cylindrical sleeve 121 which interconnects the various arms 90. The cables 123 extend vertically to a winch 125 or other means adapted to raise the cables 123 and effect a corresponding raising of the arms 90. The elevational control system 122 is useful in freeing the arm 90/rake extension 117 assembly where that assembly becomes mired in sediment collected on the bottom 17 of the tank 14. Further, the system 122 permits the operator to service the arms 90 without having to empty the tank 14.

Figure 6:
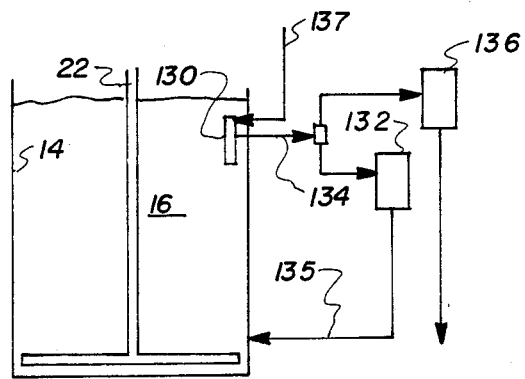
FIG. 6 is a partial schematic process diagram illustrating a filtering process of the instant invention.

As shown in FIG. 6, an internal filter 130 is positioned within the slurry 16 contained within tank 14. The filter 130 is adapted to draw liquid from the slurry 16 outward and into a conventional cloudy port filtrate receiver 132. The internal filter 130 and filtrate receivers 132 and 136 function to separate clear liquor containing soluble metabolic by-products from unoxidized and partially oxidized solids.

Internal filter 130 includes a porous medium having pores dimensioned to filter solids from fluid. Owing to the relative size of the solids vis-a-vis the medium pore size, a filter 130 initially permits some solids to be introduced into filtrate conduit 134. The cloudy port filtrate receiver 132 functions to retain these solids and reintroduce them into tank 14 along conduit 135. Upon the medium being sufficiently coated with particulates, the operative medium pore size is reduced sufficiently that the filter effectively screens out solids from the slurry liquid. As the filter begins this enhanced operation, the liquid in filtrate conduit 134 is routed to a secondary filtrate receiver 136. Liquid or liquor which passes through this second receiver 136 is thereafter discarded or disposed. The volume of liquor discarded is replaced by introducing water along conduit 137. This water serves to backwash filter 130, removing the coating of solids which has collected thereon.

A second separation system 140 is shown in FIG. 7. The system 140 includes removing a volume of slurry 16 continuously from the tank 14. The slurry 16 is then diluted by the addition of water from conduit 142. Preferably, a flocculant is added to the water or alternately the water/slurry mixture.

The slurry/water/flocculant is agitated to produce a rapid settling floc. The mixture is placed in a settling chamber 143 for at most approximately 10–15 minutes. During this time interval, the flocculated particles produced by the action of the flocculant settle out of the mixture. The settled pulp which may include unoxidized, oxidized and partially oxidized solids is then returned to the tank 14 along conduit 144. The liquor or liquid portion of the composition is drawn off through an overflow arrangement and thereafter directed to waste disposal or other treatment along conduit 147.

Figure 5:
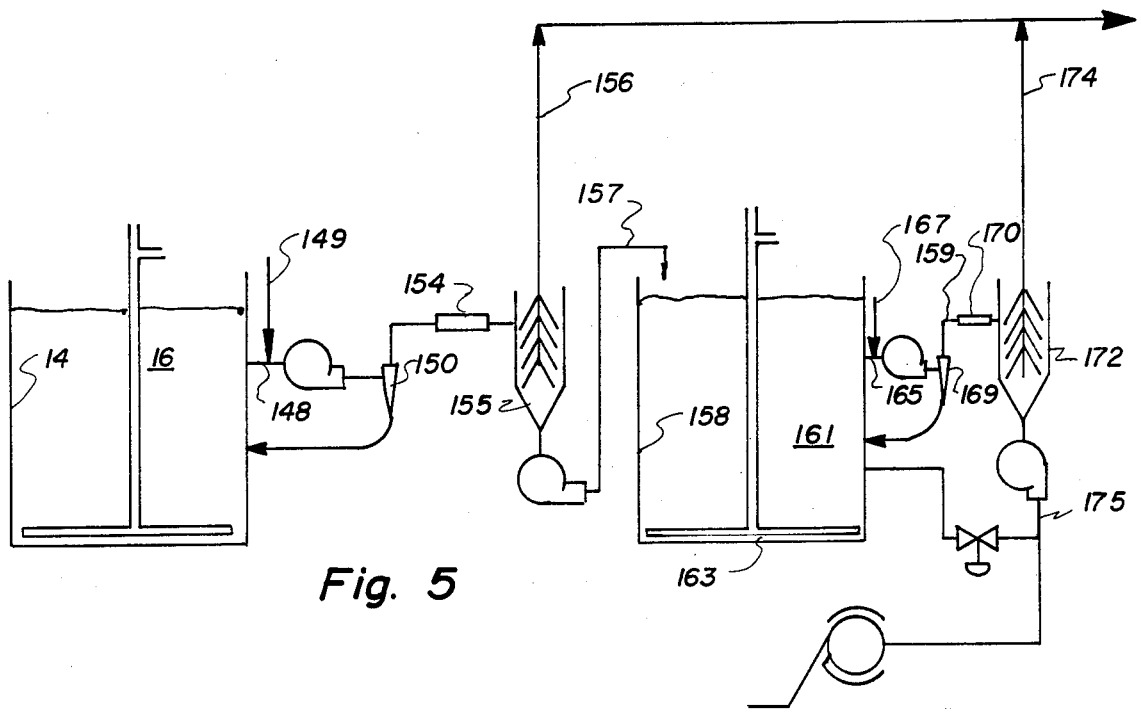
FIG. 5 is a schematic process diagram illustrating the process of the instant invention.

FIG. 5 illustrates a preferred system which operates to not only effect a solids-liquid separation but further operates to effect a separation of non-oxidized solids from partially oxidized solids. As shown, slurry 16 is drawn from tank 14 through a conduit 148. Water is added to the slurry through conduit 149. The water/slurry mixture is directed to cyclone 150. The cyclone functions to separate the relatively light non-oxidized solids from the heavier partially oxidized solids which make up the remaining components of the water/slurry mixture. The principles operative in this separation are well appreciated in the art. The non-oxidized solids are thereafter returned to tank 14 for purposes of processing. The liquid/partially oxidized mixture is then mixed with a flocculant as indicated by the block designated generally 154. The flocculant/liquid/partially oxidized mixture is then directed to a sedimentation device 155 wherein the liquid is substantially separated from the partially oxidized solids by a sedimentation process similar to that shown in FIG. 7. The liquid is directed along conduit 156 to treatment or waste disposal. The separated partially oxidized solids are channeled along conduit 157 to a second bioreactor vessel 158 which operationally parallels that of vessel 13, i.e., vessel 158 includes a tank 163 adapted for retaining a slurry composed of metal-ladened solids, liquid, microorganisms, e.g., bacteria of the type referenced when describing vessel 13's operation together with nutrients and oxygen. Vessel 158 includes a separation system 159 for separating solids from metabolic product-ladened slurry liquid. As shown, slurry 161 is drawn from tank 163 through a conduit 165. Water is added to the slurry through conduit 167. The water/slurry mixture is directed to cyclone 169. The cyclone functions to separate the relatively light non-oxidized solids from the heavier partially oxidized solids which make up the remaining components of the water/slurry mixture. The principles operative in this separation are well appreciated in the art. The non-oxidized solids are thereafter returned to tank 163 for purposes of processing. The liquid/partially oxidized mixture is then mixed with a flocculant as indicated by the block designated generally 170. The flocculant/liquid/partially oxidized mixture is then directed to a sedimentation device 172 wherein the liquid is substantially separated from the partially oxidized solids by a sedimentation process similar to that shown in FIG. 7. The liquid is directed along conduit 174 to treatment or waste. The separated partially oxidized solids are directed along conduit 175 to an external liquid/solid separation system or are recycled back to reactor 158.

The design of the various separation systems is dictated by the necessity of limiting the amount of time in which the solids (both non-oxidized and partially oxidized) are removed from the oxygen-rich environment found within either the reactor vessel 13 or 158. The bacteria utilized in the instant invention attach themselves to those solid materials. When those materials are removed from the vessel, provision of oxygen to the bacteria to maintain their activity rate is seriously limited to that oxygen within the particular volume of slurry removed, i.e., the removed slurry is not provided with an independent oxygen supply. Given this condition, the filtering systems are configured to provide a streamlined arrangement for removing the process delimiting soluble metabolic by-products found in the liquid portion of the slurry quickly to permit the reintroduction of the bacteria-laden solids back into the oxygen-rich environment found within one of the reactor vessels 13 or 158. In a preferred construction, the instant invention contemplates restricting the maintenance of the solids out of the vessel environment to at most 10–15 minutes.

The process of the instant invention consists of distinct steps. The first step includes a grinding operation of the subject metal-bearing solids. Specifically, the solids are ground to a predetermined size to aid in extraction. The grinding operation serves to increase the surface area of the solids which are to be subjected to the action of the bacteria. Further, the grinding of the solids aids in the suspension of those solids within the liquid slurry. The actual size of the ground solids may be varied so as to correspond to the particular properties of material being processed.

Preferably, closed circuit grinding is utilized with a substantial recycle ratio in order to provide a narrow sized range of solids. This grinding operation enhances a subsequent separation in the bioleaching reaction and also makes filtration and washing of the final product easier. Subsequent to the grinding operation, the ground solids are placed within a storage thickener and concentrated to a dense slurry. This formation of a dense slurry permits the operator to either intermittently or continuously feed the solids into the bioreactor vessel. The slurry is introduced into the reactor vessel together with a sufficient supply of bacteria and the requisite nutrients, oxygen and carbon dioxide necessary for the metabolism of the bacteria.

During the operation of the bioreactor vessel, compressed oxygen or oxygen containing air (hereinafter "oxygen") is continuously directed downward through channels whereupon reaching the lower regions of shaft 22 the oxygen contained within the channels is forced outwardly through radial arm 90 and subsequently ejected through diffusers 100. As the oxygen passes outward through the diffuser pores 102, small oxygen bubbles as opposed to larger aggregate bubbles are released into the slurry 16.

Due to the rotation of the arms 90, the bubbles are distributed over a wide, substantially horizontal planar area of the lower regions of the tank 14. This rotation, together with the small dimension of the diffuser pores 102 effects a wide distribution of the very small oxygen bubbles. Further, the rotation aids in hindering any formation or collision of bubbles, which collision may lead to the formation of aggregate bubbles having a smaller surface to volume ratio than that attendant a plurality of smaller oxygen bubbles.

The oxygen bubbles rise through the slurry 16 and thereby facilitate the assimilation of oxygen by the bacteria residing within the tank. The effect of the small diffuser pores 102 in creating very fine bubbles together with the rotative action of the rotary arms 90 serving to widely disperse those bubbles about the bottom of the tank creates a condition wherein a large portion of the oxygen in the bubbles is dissolved into the aqueous phase within the slurry 16. The small size of the bubbles acts to not only promote a rapid dissolution of those bubbles into the aqueous phase, but further, enhances the probability of direct interfacial transfer of the oxygen to the bacteria. This interfacial transfer contrasts with the conventional practice in which oxygen is introduced into the slurry and agitated to encourage dissolution. Thereafter, upon dissolution, the oxygen is assimilated by the bacteria. Under the instant methodology, the vessel operator can introduce into the slurry a large quantity of oxygen, a portion of which is adapted for direct interfacial assimilation by the bacteria. Further, the oxygen may be supplied in a quantity in excess of the needs of the bacteria, at an energy consumption rate which is measurably smaller than the conventional approach. Indeed, under the prior practice, the high cost of achieving an adequate oxygen supply for the bacteria resulted in processes wherein the supply was purposely limited to a quantity below that required for maximum bacterial activity due to energy considerations. Under the instant method, the energy consumption is so reduced that oxygen may be supplied in excess of the amounts requisite for optimal bacterial activity, while maintaining energy costs within an acceptable cost range.

Further, the bubbles are introduced proximate the bottom of the tank and due to differences in specific gravity, rise upwardly through the slurry. The slurry in contrast is being drawn downwardly as quantities of slurry proximate the bottom open end 62 of shaft 22 are being drawn into the interior channel 34 of shaft 22 and thereafter directed upwardly within that channel. Eventually, the slurry is discharged over the surface 27 through riffle tubes 70. The effect of this slurry flow creates a general downward movement of that portion of the slurry within the tank and exterior to the interior channel 34. This slurry flow serves to retard the upward movement of the oxygen bubbles. Further, this retardation increases the residence time of the bubbles within the slurry and thereby enhances the probability that the oxygen will be dissolved within the slurry and utilized by the bacteria.

During the operation of the bioreactor vessel cold water is injected into the interior of the shaft 22 and forced downwardly therein. The exothermic nature of the reaction occurring within the tank 14 serves to heat the slurry 16 within the tank. The cold water being separated by the wall of shaft 22 absorbs heat through that wall from the higher temperatured slurry 16 as it continues downwardly through the interior of the shaft 22. Subsequently, the warmed or heat-laden water is drawn upwardly through channel 53 and upon reaching the upper regions of shaft 22 the water is discharged or cooled in an external heat exchanger or cooling tower and recycled.

Furthermore, during the operation of the bioreactor vessel 13, air is directed downward along the interior of pipe 57, eventually exiting through a diffuser or nozzle 60. Slurry 16 which is within shaft 22 thereafter is driven upwardly by the motion of the air bubbles formed at the tip of diffuser 60. The air bubbles/slurry mixture rises upwardly through the interior channel 34 of shaft 22. The slurry 16 subsequently exits through riffle tubes 70 and is distributed over the surface 27 of the slurry 16.

During the operation of the reactor vessel 13 an internal filtration system 130 operates to remove soluble products laden solution from the slurry mixture. As shown, a filter medium 130 serves initially to screen particulates from entering a conduit system which is directed to a cloudy port filtration system 132. The internal filter 130 is fitted with a backwash water conduit 137 whereby water may be injected along conduit 137 and thereby discharge particulates which have collected on the internal filter medium 130.

Critical to a proper operation of the instant invention is the control of the constituents and environment within the reactor vessel. The factors of special importance include temperature, the rate and mechanism of oxygen input, the ratio of biomass (bacteria) to suspended solids, the ratio of reacted solids to unreacted solids, the concentration of soluble species generated as products or by-products and the concentration of carbon dioxide and nutrients.

The preferred species of bacteria utilized in the instant process are those which are most stable and exhibit the broadest set of enzymatic activity when their ambient temperature is maintained in approximately the 30°-36° Celsius range, i.e., the mesophilic range. Upon the temperature rising above approximately 46° Celsius, these particular species of bacteria are either extinguished or their activity severely limited. In that the reaction effected within the reactor vessel is exothermic in nature, absent a withdrawal of the heat produced in reaction, the bacteria would be negatively affected. Accordingly, the instant reactor vessel includes a heat exchanger adapted to absorb heat produced within the vessel 13 and transfer that heat from the vessel to effect thereby an optimized thermal condition for bacteria growth and activity.

The rate and mechanism of oxygen input into the vessel has been discussed above. Due to the input of oxygen into the slurry in the form of widely dispersed small bubbles (i.e., having mean diameters less than approximately 2 mm.) a high surface to volume ratio of oxygen is obtained. The minute size of the bubbles effects an increased rate of dissolution or diffusion of the oxygen directly into the water. Further, the bubble size results in an enhanced quantity of oxygen-ladened bubbles which permit interfacial transfer of the oxygen to the bacteria. Owing to the density difference between the oxygen bubbles and the slurry, the bubbles have a limited residence time within the slurry before rising to the surface of the slurry and discharging into the environment. The present invention involves a means of making the oxygen readily assimilatable upon its input into the slurry. The oxygen is in a useful form throughout its ascension time through the slurry. Indeed, in tests conducted with a prototype of the vessel, oxygen uptake rates in the range of 400 milligrams per liter per hour were obtained at an oxygen transfer efficiency greater than 60%. Efficiency is defined for this instance as the amount of oxygen absorbed by the bacteria divided by the initial amount of oxygen introduced into the vessel.

The rotation of the arms effects a dispersion of the bubbles about a substantially horizontal plane within the vessel. The arms are therefore relatively slow in rotation in comparison to the typical tip speed of turbines used in the conventional methodology. Resultingly, the arms avoid cavitation effects thereby preserving the high surface/volume ratio of the bubbles. Further, the relative slow arm rotation minimizes the energy requirements requisite to operate the vessel.

In normal operation, the oxygen input rate is maintained at a constant rate. This rate is of sufficient magnitude to exceed the needs of the bacteria resident within the vessel. This approach contrasts with the conventional method wherein due to the energy expense, the oxygen supply may typically be held to a quantity below the requisite level for optimum bacterial activity.

The most important criteria attending the optimum operation of the instant process is the maintenance of a high biomass to solids ratio. The biomass population may be delimited by an inadequate supply of oxygen, carbon dioxide, nutrients, or alternately an excessive presence of soluble metabolic end products or by-products. Under the instant method the supply of oxygen, carbon dioxide and nutrients is maintained at levels which exceed the demands of the bacteria population. The metabolic end products are selectively removed from the slurry during the vessel's operation. These end products are of two types: soluble constituents and insoluble reacted solids. The soluble constituents are removed by processing the slurry to effect a separation of suspended solids from the liquid liquor or medium. This separation is achieved by a continuously operating, internal filter within the bioreactor. Alternatively, the separation may be achieved by sedimentation. Flocculation of all of the suspended solids may be employed to enhance the solids-liquid separation. Upon separation, the clarified liquor is removed from the system while captured solids are advanced either to a second reactor vessel or are returned to the first reactor vessel. The bacteria typically adhere to the solid material. The separation of solids from liquid medium results in a minimum loss of bacteria from the vessel population in that the separated solids are subsequently returned to the first or second reactor vessel.

The solids removed may include reacted solids and unreacted solids. The reacted solids are separated from the unreacted solids by the use of selective gravity separation in a cyclone, centrifuge or gravity settling device. Unreacted solids are returned to the reactor vessel. Partially reacted solids are advanced to a secondary reactor for purposes of further bacterial processing. The final reacted product is removed and may be subjected to conventional leaching.

The intent of the instant process is to sustain a maximum reaction rate. Due to the improvement in oxygen supply technology of the instant invention, the method presently results in the optimization of processing by providing a surplus of oxygen and other requisite nutrients, keeping the process temperature within a narrow optimal range and further removing reaction delimiting metabolic by-products. Further, this removal is continuous and operates to minimize the loss of bacteria which resulted under the conventional method.

It is to be understood that the embodiments of the invention herein described are merely illustrative of the application of the principles of the invention. Reference herein to details of the illustrated embodiment is not intended to limit the scope of the claims which themselves recite those features regarded as essential to the invention.

We claim:

1. A reactor vessel for use in processing metal-ladened solids through use of a bioleaching process, said vessel comprising:
 a container means, having a base member, adapted to contain a metal-bearing solids slurry; and
 an oxygen supply means mounted within said container means, said supply means including a plurality of uprightly oriented, planar faced diffusers mounted to rotate above said container base member about a vertical axis, each of said diffusers including a vertically mounted porous membrane adapted to receive a supply of oxygen gas and to produce therefrom gas bubbles in clear water having a maximum mean diameter of approximately two millimeters, said membrane being adapted to introduce and disperse oxygen-containing gas into said slurry.

2. The vessel according to claim 1 wherein said porous membrane of each said oxygen diffuser is oriented into and transverse of a flow of slurry induced by said diffuser rotation, wherein said flow of slurry over said diffuser membranes breaks up gas bubbles emerging from said membranes into fine bubbles and further scours said membrane to maintain the pores of said membranes free of obstructions.

3. The vessel according to claim 1 wherein each of said diffusers is mounted perpendicular to a radius extending outwardly from a vertically oriented drive shaft, said drive shaft being positioned colinear with an upright longitudinal axis of said container means, wherein said planar face of said diffuser is oriented substantially parallel to a flow path of slurry past each of said diffusers.

4. The vessel according to claim 3 wherein said diffusers are mounted upright and vertical, wherein each said membranes faces into said slurry flow such that an entire surface of said membrane is contacted and scoured by said slurry flow.

5. The vessel according to claim 4 wherein said outer surface of said diffuser membranes is fabricated from a hydrophobic material.

6. The vessel according to claim 3 wherein said oxygen supply means comprises:
 a drive shaft mounted rotatably within said container means;
 a plurality of arms mounted on said drive shaft to extend radially outward therefrom;
 a plurality of diffusers, at least one diffuser being mounted on each arm wherein a rotation of said drive shaft effects a displacement of said diffusers within said container means in a generally circular path; and
 a conduit means adapted to receive oxygen-containing gas from a sourced exterior to said vessel and convey said oxygen containing gas to said diffusers.

7. The reactor vessel according to claim 6 wherein each of said arms defines an interior channel therein, each said channel being dimensioned to receive oxygen-containing gas from a supply means mounted on said drive shaft and convey said oxygen-containing gas to said diffusers.

8. The reactor vessel according to claim 7 wherein said arms are made slidable along the length of said drive shaft, said arms being fitted with lifting means adapted to raise said arms above a surface level of slurry within said container means to permit servicing of said diffusers.

9. The reactor vessel according to claim 1 wherein said vessel includes a cooling means for absorbing heat produced within said container means and transferring said heat away from said container means.

10. The reactor vessel according to claim 9 wherein said cooling means comprises:
 a first conduit member positioned within said drive shaft, said first conduit member being configured to receive and direct a heat-absorbing fluid along an interior surface of said drive shaft wherein heat absorbed by said drive shaft from said slurry is transferred to said fluid; and
 a second conduit member adapted to receive said heat ladened fluid and remove that fluid from said drive shaft to a location exterior of said container means.

11. The reactor vessel according to claim 1 wherein said container means includes a filter means adapted to draw off from said slurry liquor which is free from suspended solids while retaining said suspended solids within said container means.

12. The reactor vessel according to claim 1 wherein said vessel includes removal means adapted to isolate and remove metal solids from said container means, while retaining said slurry within said container means.

13. The reactor vessel according to claim 12 wherein said removal means comprises:
 a third conduit means configured to receive a quantity of said slurry located adjacent said container base and convey said quantity of slurry vertically upwards above a surface level of said slurry; and
 a plurality of riffle tubes adapted to receive said quantity of said slurry from said third conduit means and separate metal solids from said quantity of slurry, said riffle tubes having means of returning said quantity of slurry to said slurry within said container means.

14. A reactor vessel for use in processing metal-bearing solids through bioleaching, said vessel comprising:
 a tank having a bottom and upright walls mounted on said bottom, said tank being dimensioned to contain a liquid suspension of sulfide containing, metal-bearing solids, water, a quantity of thiobacillus bacteria capable of oxidizing said sulfides, carbon dioxide, oxygen and nutrients for said bacteria;
 a drive shaft mounted vertically upright and rotatably within said tank;
 a plurality of arms on said drive shaft extending radially therefrom, said arms being positioned above said tank bottom;
 at least one uprightly oriented planar faced diffuser mounted on at least one of said arms;
 an oxygen-containing gas delivery conduit means mounted within said tank, said conduit means adapted to receive oxygen-containing gas from a source exterior of said tank and convey said oxygen-containing gas to each of said diffusers; each of said diffusers including a porous, vertically mounted membrane having a planar face, each of said membranes being adapted to receive a supply of oxygen gas and disperse said gas into said slurry in the form of fine bubbles across said planar face of said membrane; and a drive means made mechanically cooperative with said drive shaft wherein said drive means effects a rotation of said drive shaft, said arms and said diffusers about an upright longitudinal axis of said tank;

a separation means mounted on said tank for removing a quantity of said liquid suspension from said tank, and separating from said quantity of suspension any metal solids from the class consisting of oxidized metal solids and partially oxidized metal solids, said separation means being adapted to convey said oxidized and partially oxidized metal solids to a second reactor system while returning a remainder of said quantity of suspension to said tank.

15. The reactor vessel of claim 14 wherein said separation means is adapted to remove said quantity of suspension from said tank, effect said separation, and return said remainder of said quantity of suspension to said reactor system and direct said oxidized metal solids to a second reactor system within a time period of less than 15 minutes.

16. The reactor vessel according to claim 14 wherein said separation means is a cyclone, adapted to remove oxidized and partially oxidized metal cocentrates from said tank-contained suspension.

17. The reactor vessel according to claim 14 wherein said separation means is a centrifuge adapted to remove oxidized and partially oxidized metal concentrates from said tank-contained suspension.

18. The reactor vessel according to claim 14 wherein said separation means is a gravity separator adapted to remove oxidized and partially oxidized metal concentrates from said tank-contained suspension.

19. The reactor vessel according to claim 14 wherein said separation measn utilizes selective flocculation for removing oxidized and partially oxidized metal concentrates from said tank-contained suspension.

20. The reactor vessel according to claim 14 wherein said tank includes a filtering means adapted to separate clear liquid from the tank-contained suspension through an internal filter mounted within said tank, said filtering means adapted to function continuously during operation of said reactor system.

21. A reactor vessel for use in processing metal-bearing solids through use of a bioleaching process, said vessel comprising:

a tank having a bottom and upright walls mounted on said bottom, said tank being configured to contain a metal-bearing concentrate slurry;

an oxygen supply means mounted within said tank for supplying oxygen to said slurry, said supply means comprising: a drive shaft mounted upright within said tank, said drive shaft being rotatable about a vertical, upright axis;

a plurality of arms mounted radially on said drive shaft, said arms being located above said tank bottom wherein a rotation of said drive shaft effects a rotation of said arms about said vertical axis, said arms being made slidable along the length of said drive shaft and said arms being fitted with lifting means adapted to raise said arms above a surface level of said slurry within said tank wherein said arms are made accessible for maintenance;

a plurality of uprightly oriented planar faced diffusers positioned on each of said arms, each of said diffusers having a porous planar face membrane configured to receive a supply of oxygen containing gas and to produce gas bubbles in clear water having mean diameters of at most approximately two millimeters; said planar face of each of said diffusers being oriented to confront a flow of slurry induced by a rotation of said diffusers about said upright axis, wherein said flow of slurry passes over an entire surface of said diffuser membrane to break up gas bubbles emerging from said membrane face and scour said membrane face to maintain said pores of said membrane free from obstruction; and a conduit means mounted within said tank for receiving oxygen-carrying gas from a source exterior to said tank and conveying said gas to gas to said diffusers;

a cooling means mounted within said tank adapted to absorb heat produced within said container means and transfer said heat away from said container means;

a filtering means mounted in said tank adapted to remove suspended solids-free liquor from said slurry; and convey said liquor to disposal exterior of said tank; and a removal means mounted within said tank adapted to remove a quantity of slurry from said tank, said removal means operating to separate any oxidized and partially oxidized metal solids from said quantity of slurry, said removal means being adapted to then convey said oxidized and partially oxidized metal solids to a second reactor system, and recycle said quantity of slurry, which includes those metal solids which are as yet unoxidized, to said tank.

22. The vessel of claim 21 wherein said cooling means includes:

a first conduit member positioned within said drive shaft, said first conduit member configured to receive and direct heat-absorbing fluid along an interior surface of said drive shaft whereby heat absorbed by said drive shaft from said slurry is transferred to said fluid; and a second conduit member adapted to receive said heat-absorbing fluid and remove that fluid from said drive shaft, 23. The reactor vessel of claim 21 wherein said removal means includes:

a third conduit means configured to receive a quantity of said slurry located proximate said container base member and to direct said quantity of said slurry vertically above the remaining slurry; and a plurality of riffle tubes mounted on said third conduit means, said riffle tubes adapted to receive said quantity of said slurry from said third conduit means and separate from said quantity of slurry solids, said riffle tubes having means of returning said quantity of slurry to the container means.

24. The reactor vessel according to claim 21 wherein said diffusers include a sufficient number of injection ports to facilitate a transfer of oxygen to said slurry of a magnitude to support a biooxidation uptake rate in excess of approximately 250 milligrams per liter per hour.

* * * * *